United States Patent [19]
Atkins et al.

[11] 3,938,921
[45] Feb. 17, 1976

[54] MOULDS

[75] Inventors: George Atkins, Sutton Coldfield; Philip J. Evans, Birmingham, both of England

[73] Assignee: Dunlop Limited, London, England

[22] Filed: Aug. 11, 1972

[21] Appl. No.: 279,752

[30] Foreign Application Priority Data
Aug. 12, 1971 United Kingdom............ 37837/71

[52] U.S. Cl................ 425/111; 425/47; 425/182; 425/472
[51] Int. Cl.²............................................ B29D 3/02
[58] Field of Search.......... 425/110, 111, 182, 185, 425/468, 28, DIG. 12, 49, 47, 48, 470, 472; 308/244

[56] References Cited
UNITED STATES PATENTS

| | | | |
|---|---|---|---|
| 2,380,380 | 7/1945 | Bacon, Jr. | 425/28 |
| 2,415,412 | 2/1947 | Buchwald et al. | 425/DIG. 12 |
| 2,687,260 | 8/1954 | Morin | 425/468 X |
| 2,709,845 | 6/1955 | Serkin | 425/111 UX |
| 3,121,947 | 2/1964 | Knox | 425/47 X |
| 3,583,047 | 6/1971 | Uchilyama | 425/111 |
| 3,669,401 | 6/1972 | Nevareg | 425/110 |
| 3,672,626 | 6/1972 | Thornton | 425/182 X |
| 3,740,178 | 6/1973 | Neil | 425/468 |

Primary Examiner—Robert L. Spicer, Jr.
Attorney, Agent, or Firm—Stevens, Davis, Miller & Mosher

[57] ABSTRACT

A multi-piece mould, and a method of constructing it, for moulding wire reinforced rubber articles; the mould comprises material having a greater coefficient of expansion than said wire, and having a gasket of thermoplastic material which soften at the temperature of moulding, provided between at least two adjacent mould pieces, whereby during moulding the gasket is caused to flow by the expanding mould pieces and thereby compensate for the expansion of the mould material, of which the following is a specification.

15 Claims, 7 Drawing Figures

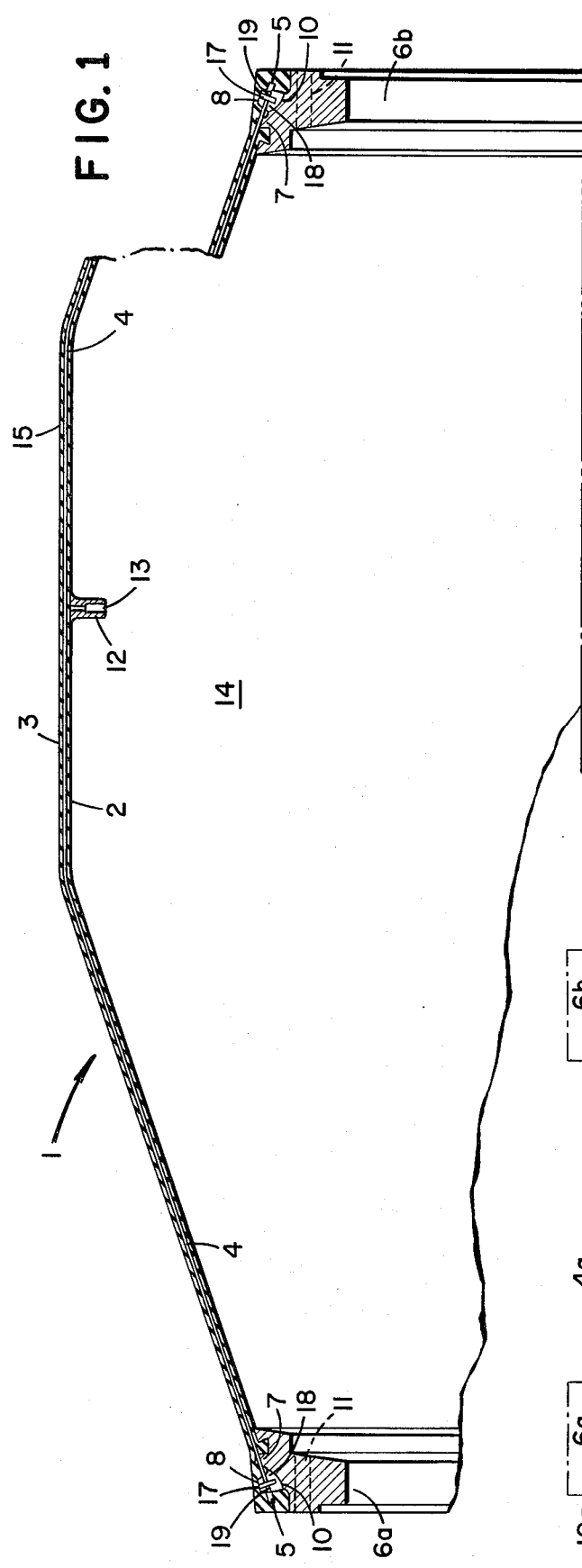
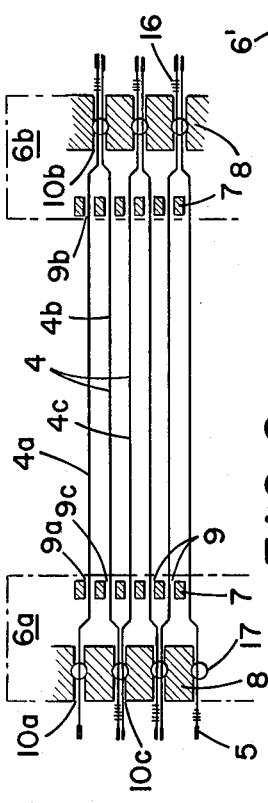
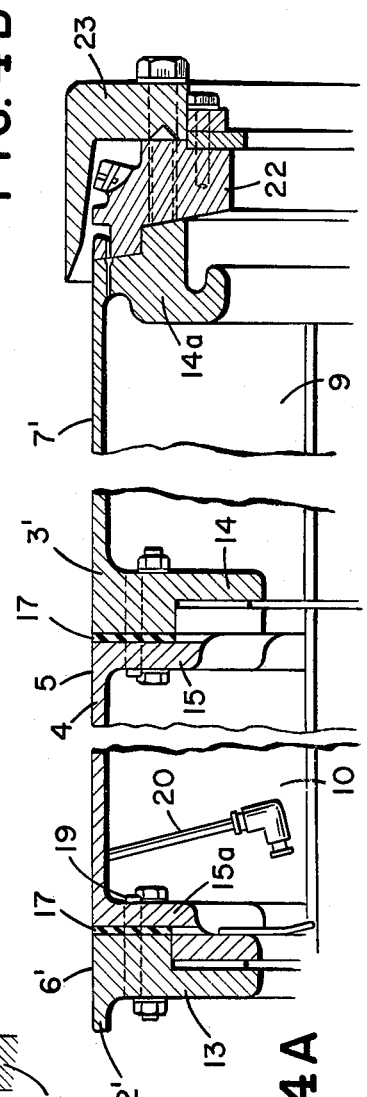

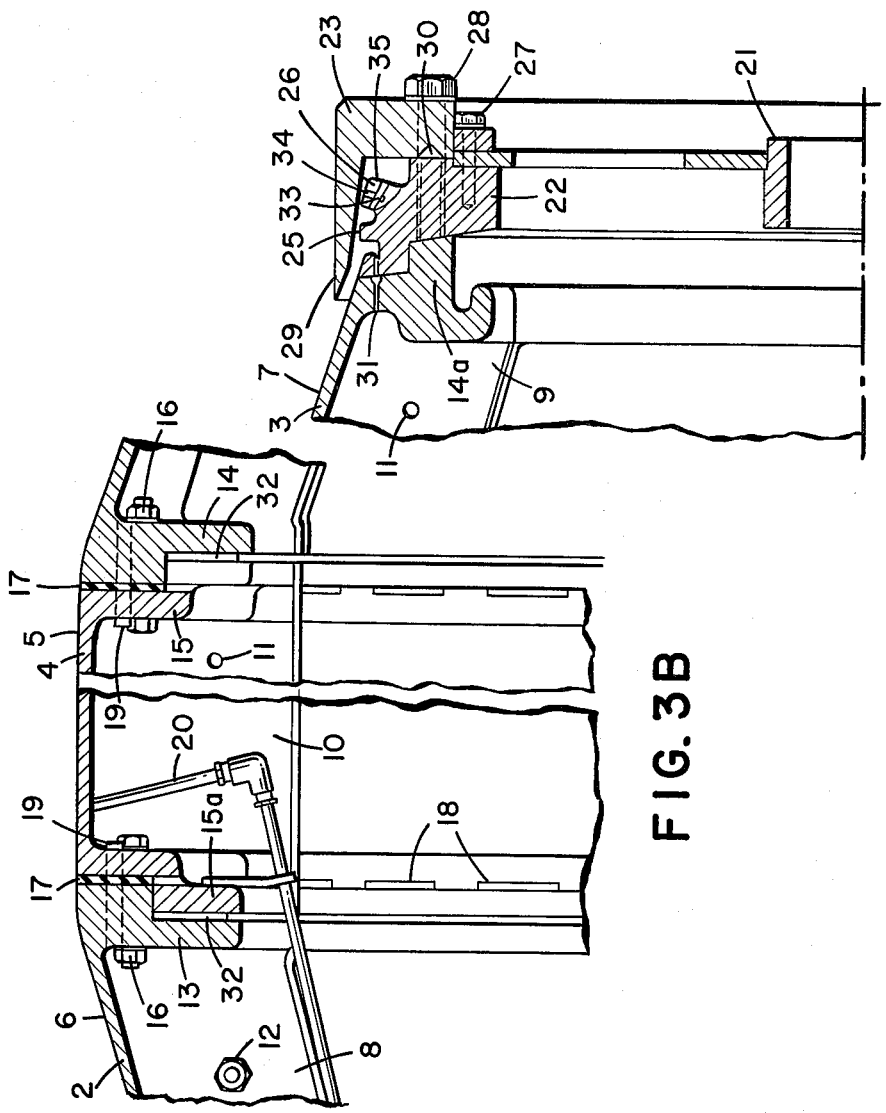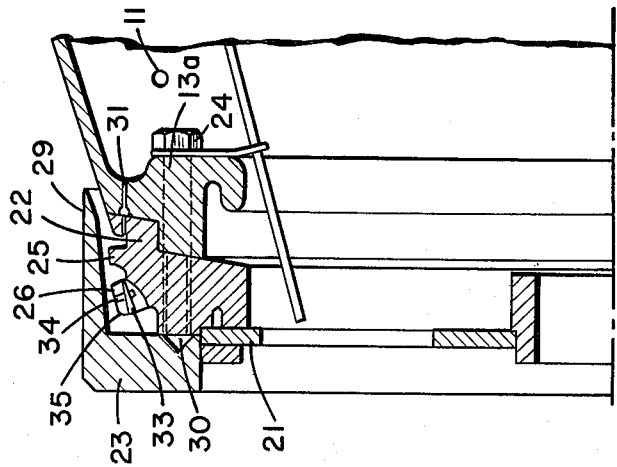

MOULDS

This invention relates to moulds and particularly to moulds for use in the manufacturing of wire reinforced rubber articles.

Previously, moulds for manufacturing wire reinforced rubber articles have generally been constructed from metals such as steel. The disadvantages of this type of mould are that they are expensive and heavy thereby causing difficulty in assembling and dismantling of such moulds.

The disadvantage of moulds constructed from suitable lighter and relatively inexpansible materials e.g. fibre glass is that their coefficients of expansion are greater than the coefficient of expansion of the wires, so that large stresses occur in the mould and the wires during heating.

According to the invention, apparatus for moulding wire reinforced rubber articles comprises a moulding surface said surface being a peripheral surface of a multipiece mould, said mould being constructed of a material having a greater coefficient of expansion than said wire, at least one spacer element being provided between at least two adjacent mould pieces, said element comprising a material which is thermoplastic and softens at the temperature of said moulding, whereby during the moulding said element is caused to flow by the expanding mould pieces and thereby compensate for the expansion of the mould material.

According to a further aspect of the invention, a method of constructing a multi-piece mould for use in manufacturing wire reinforced rubber articles comprises building said mould pieces of a material having a greater coefficient of expansion than said wire and providing at least one spacer element between at least two adjacent mould pieces, said element comprising a material which is thermoplastic and softens at the temperature of said moulding, whereby during use of the mould in moulding an article said element is caused to flow by the expanding mould pieces and thereby compensate for the expansion of the mould.

Preferably the material having a greater coefficient of expansion than the wire is a fibre glass/resin composite.

The material of the spacer element may be of a wide range of thermoplastic materials and may suitably be, for example, a thermoplastic polyolefin such as polyethylene.

The multi-piece mould can be of any desired shape but is preferably of cylindrical or barrelled shape and is preferably provided on its axially outer edges with means for securing wires of the wire reinforced article. The mould may be provided with means to facilitate its being rotatably mounted.

The mould may, for example, be a mould for use in moulding wire reinforced shaping diaphragms and more particularly shaping diaphragms for use in shaping radial ply pneumatic tyre carcasses.

A mould in accordance with the invention will now be described by way of example only with reference to the accompanying drawings:

FIG. 1 shows a sectional view of part of a radial ply pneumatic tire shaping diaphragm according to the invention.

FIG. 2 shows a diagrammatic plan view of the location of wires in the diaphragm shown in FIG. 1.

FIGS. 3A, 3B, and 3C shows a half axial cross-section of a mould in accordance with the invention.

FIGS. 4A and 4B show a half axial cross-section view of another mold in accordance with the invention.

The mould 1 is for use in moulding a wire reinforced rubber diaphragm, and comprises two frusto-conical pieces 2 and 3 and a cylindrical centre piece 4. Each of the pieces 2, 3 and 4 consists of eight segments and is made of a fibre glass/resin composite material.

In modification of the mould (not shown) the outer peripheral surface 5 of the centre piece 4 has a convex shape to ensure the continuity of shape of the diaphragm in conjunction with the frusto-conical outer peripheral surfaces 6 and 7 of the pieces 2 and 3 respectively.

The mould pieces 2, 3 and 4 are each provided with webs for example 8, 9 and 10 respectively, which help to support and strengthen the pieces and also facilitate the joining of the segments making up pieces, the joint being secured by nuts and bolts 12 passing through holes 11 in the webs.

The mould pieces 2, 3 and 4 are each provided at both ends with flanges 13, 13a; 14, 14a; and 15, 15a respectively. The provision of the stepped flanges 15, 15a on the centre piece 4 and the complementary stepped flanges 13 and 14 on pieces 2 and 3 respectively facilitates the accurate location of the pieces 2 and 3 with respect to the centre piece 4. The pieces 2 and 3 with respect to the centre piece 4. The pieces 2 and 3 are secured to the centre piece 4 by means of nuts and bolts 16 which, in addition, secure spacer elements in the form of polyethylene gaskets 17 in position between the mould pieces 2 and 3 and the centre piece 4. Spew holes 18 are provided in the centre piece 4 of the mould, to enable softened polyethylene to be extruded from between the mould pieces 2, 3 and 4 by the expansion of the mould pieces 2, 3 and 4 during moulding of the diaphragm.

Metal tubes 19 are also provided to allow water from condensed steam to flow into the mould centre piece 4 during moulding. The water collecting in the bottom of the mould centre piece 4 being syphoned off by syphon tubes 20, the operating steam pressure forcing the water through the tubes 20.

In the assembled condition of the mould, the mould is also provided with hubs 21, end rings 22 and outer rings 23. An axle can be introduced into the hubs 21 thus enabling the mould 1 to be rotatably mounted.

The end rings 22 are of complementary shape to the flanges 13a and 14a of the pieces 2 and 3 respectively to facilitate the accurate location of said end rings 22, on the mould, said end rings 22 being secured to the flanges by screws 24. The end rings 22 are provided with ribs 25, which are provided with slots, each slot being a locating means for a wire during the building of the diaphragm on the surfaces 5, 6 and 7. Similarly ribs 26 which are provided on the end rings 22, are provided with notches, each notch being a locating means for the nippled ends of pairs of wires during the building of the diaphragm on the surfaces 5, 6 and 7.

The hubs 21 and outer rings 23 are attached to the end rings 22 by means of screws 27 and 28 respectively. The outer rings 23 are provided with axially extending flanges 29 which extend over the end rings 22. Spew hole 30 and spew groove 31 are respectively provided in the outer rings 23 and between the end rings 22 and mould pieces 2 and 3.

In operation, the mould pieces 2, 3 and 4 are assembled with the gaskets 17 in position. If necessary, small pieces of polyethylene can be inserted in the spaces 32 to assist assembly of the mould 1. The end rings 22 are secured to the pieces 2 and 3 and the hubs 21 are secured to the end rings. An axle is introduced through the hubs 21.

A first layer of rubber is applied to the outer peripheral surfaces 5, 6 and 7 of the mould 1, the layer ending axially inwardly of the ribs 25. Wires, each end of each of which being provided with a nipple, are then positioned, on said first layer of rubber, in a plane which passes through the axis of rotation of said mould 1, each wire being located in its individual slots in the ribs 25. Pairs of wire ends are then located in the notches provided in ribs 26, the nipples of said wires abutting the axially outer surfaces 35 of the ribs 26, said surfaces 35 being cam shaped. The pairs of wires are then individually tensioned by the use of metal pads 33, positioned between the wires in the notches, and grub screws inserted into screw holes 34. Thus the nipples of said wires are forced axially outwardly by said cam surfaces 35 without any damage being sustained by the pairs of wires.

A second layer of rubber is then applied over the wires, said layer extending over the ribs 25 and 26. The outer rings 23 are then secured to the end rings 22, the flanges 29 of said outer rings 23 ensuring that the ends of the assembled diaphragm are securely held during moulding.

After moulding, the axle and the hubs 21 are removed and the remainder of the assembly is supported by the outer rings 23, each flange 29 of which rests on two rollers. The mould 1 is then collapsed and the diaphragm removed, the end rings 22 now being integral with the diaphragm, collapse of the mould 1 being facilitated by the segmental construction of the mould pieces 2, 3 and 4 the segments being shaped so that they may be removed through the interior of the mould 1.

In a modification, in order to reduce the possibility of the polyethylene gaskets 17 flowing onto the moulding surfaces 5, 6 and 7 during moulding strips of material e.g. shim steel can be wrapped around the moulding surfaces to cover the openings. In addition, the amount of polyethylene in the annulus may be reduced.

In a further preferred embodiment of the invention the gaskets 17 are dispensed with, and spacer elements in the form of small pieces of polyethylene are inserted into spaces 32. To ensure that the rubber of the diaphragm does not flow, during moulding, into the spaces left by the gaskets 17 strips of shim steel are wrapped around the mould to cover the spaces. This embodiment ensures that the polyethylene is not near the moulding surfaces and also reduces the amount of polyethylene used.

The construction of a diaphragm moulded on the mould according to the invention is described below.

The diaphragms are wire-reinforced rubber shaping diaphragms, particularly the cylindrical or barrel shaped diaphragms for shaping green pneumatic tires or tire carcasses from a substantially cylindrical shape to the toroidal shape of a finished tire.

According to the invention, an annular wire reinforced rubber shaping diaphragm comprises a layer of rubber in which a plurality of individual wires are embedded, said wires being disposed substantially at right angles to the mid-circumferential plane of the diaphragm, and an end ring at each axially outer edge of said diaphragm, each end of each wire being anchored to its respective end ring.

The word "rubber" as used in this specification denotes any suitable curable elastomeric material.

The diaphragm preferably comprises a diaphragm for shaping radial ply pneumatic tires.

The diaphragm may be provided with at least one valve communicating between the interior of the diaphragm and a surface of the diaphragm which comes into contact with an article to be shaped thereon to assist in the shaping and removal of said article.

Each end of each of said wires may be provided with an enlargement, said enlargement preferably being in the form of a nipple, to assist in anchoring said wires to said end rings.

The end rings may be provided with at least one circumferentially extending rib, said rib being provided with axially extending slots in which said wires can be located.

The effective length of each said wires may be adjustable, and is preferably adjustable by the provision of washers on each of said wires, the removal of which effectively lengthens each of said wires.

A diaphragm according to the invention will now be described, by way of example only, with reference to the accompanying informal drawings of which:

FIG. 1 shows a sectional view of part of a radial ply pneumatic tire shaping diaphragm according to the invention, and FIG. 2 shows a diagrammatic plan view of the location of wires in the diaphragm shown in FIG. 1.

The barrel shaped diaphragm 1 comprises two layers of rubber 2 and 3 between which are located individual wires 4, each wire being provided with an enlargement in the form of a nipple 5 at each end. The ends of the wires 4 are anchored in end rings 6a and 6b which are provided with circumferentially-extending ribs 7 and 8, provided with axially-extending slots 9 and 10 respectively (see FIG. 2) in which the wires 4 are located. Each end ring 6a and 6b is provided with axially-extending holes 11 for the location of bolts when the diaphragm 1 is assembled with a tire shaping machine.

The diaphragm 1 is provided with two diammetrically-opposite valves 12, only one of which is shown, each valve being provided with a bore 13 extending coaxially therewith connecting the interior 14 of the diaphragm 1 with the shaping surface 15 of said diaphragm 1.

The method of wiring said diaphragm 1 will now be described with reference to FIG. 2.

Each of the wires 4 are provided with washers 16 which allow the length of each wire 4 to be adjusted by the removal of said washers 16.

One end of a first wire 4a is located in slot 10a of the end ring 6a, being held in place by a grub screw 17 and is then located in slots 9a and 9b one slot in each end ring 6a and 6b respectively. The other end of said wire 4a is located in slot 10b in the other end ring 6b, the length of aid wire 4a being adjusted by removal, if necessary, of washers 16. A metal pad 18 (see FIG. 1) is placed over the wire 4a to hold it in position. A second wire 4b is then located over the metal pad 18 in slot 10b and a grub screw 17 inserted until the correct tension is obtained in the wire 4a, the tensioning of the wires 4 being assisted by the ribs 8 which are provided with a cam surface 19 (see FIG. 1) on their axially outer surface, which surface 19 engages the nipples 5 and force the wires 4 axially outwardly of the diaphragm 1 as the grub screws 17 force the wires 4 radially inwardly of said diaphragm. The wire 4b is then located in slots 9c and 10c respectively, the tensioning procedure then being carried out using a metal pad 18, wire 4c and a grub screw 17. This procedure is carried out until the necessary number of wires are located around the circumference of the end rings 6a and 6b.

The construction of the diaphragm comprising integral end rings obviates the necessity of providing split rings in which the axially outer edges of previously known diaphragms, i.e. of the type shown in the tire shaping apparatus disclosed in U K Pat. No. 932 792, were located when the diaphragms were assembled with a shaping apparatus. With the diaphragm of the invention the end rings can be connected directly to the shaping apparatus.

Having now described our invention what we claim is:

1. Apparatus for moulding wire reinforced rubber articles comprising a moulding surface said surface being a peripheral surface of a multi-piece mould, said mould being constructed of a material having a greater coefficient of expansion than said wire, at least one spacer element being provided between at least two adjacent mould pieces, said element comprising a material which is thermoplastic and softens at the temperature of said moulding, whereby during the moulding said element is caused to flow by the expanding mould pieces and thereby compensate for the expansion of the mould material.

2. Apparatus according to claim 1 wherein said material having greater coefficient of expansion than the wire is a fibre glass/resin composite.

3. Apparatus according to claim 1 wherein the thermoplastic material from which said element is formed comprises a themoplastic polyolefin.

4. Apparatus according to claim 3 wherein said thermoplastic polyolefin is polyethylene.

5. Apparatus according to claim 1 wherein said multi-piece mould is of substantially cylindrical shape.

6. Apparatus according to claim 1 wherein said multi-piece mould is of substantially barrelled shape.

7. Apparatus according to claim 1 wherein said multi-piece mould comprises two end pieces and a centre piece.

8. Apparatus according to claim 7 wherein said end pieces are frusto-conical in shape and said central piece is cylindrical in shape.

9. Apparatus according to claim 7 wherein said element is located at least one between each end piece and the centre piece.

10. Apparatus according to claim 9 wherein said element comprises small pieces of said material located between each end piece and the central piece whereby during moulding of the diaphragm said elements are caused to flow by the expanding mould pieces and thereby compensate for expansion of the mould.

11. Apparatus according to claim 9 wherein said element comprises an annular gasket located between each end piece and the central piece whereby during moulding of the diaphragm said gaskets are caused to flow by the expanding mould pieces and thereby compensate for expansion of the mould.

12. Apparatus according to claim 7 wherein a strip of material is wrapped around the opening between mould pieces whereby during moulding the material of the element is prevented from flowing on to the mould surface or rubber is prevented from flowing into said openings.

13. Apparatus according to claim 1 wherein said multi-piece mould is provided with means to facilitate it being rotatably mounted.

14. Apparatus according to claim 5 wherein said multi-piece mould is provided on its axially outer edges with means for securing said wires of the article.

15. Apparatus according to claim 6 wherein said multi-piece mould is provided on its axially outer edges with means for securing said wires of the article.

* * * * *